United States Patent [19]

Herring et al.

[11] Patent Number: 4,856,851
[45] Date of Patent: Aug. 15, 1989

[54] RELAY AND BOOSTER VALVES FOR AIR BRAKE SYSTEMS

[76] Inventors: Clarence R. Herring; Curtis E. Radcliffe, both of 13530 Nelson Ave., P.O. Box 2385, City of Industry, Calif. 91746

[21] Appl. No.: 58,406
[22] Filed: Jun. 5, 1987
[51] Int. Cl.⁴ .............................................. B60T 11/12
[52] U.S. Cl. ............................................ 303/40; 303/7
[58] Field of Search .................... 303/7, 13, 29, 30, 40, 303/50, 52, 54, 56

[56] References Cited

U.S. PATENT DOCUMENTS 3,411,836  11/1968  Dobrikin et al. ...................... 303/40
4,078,844   3/1978  Richmond et al. ................ 303/40 X Primary Examiner—Duane A. Reger
Attorney, Agent, or Firm—John E. Wagner

[57] ABSTRACT

The relay valve employs a body preferably of metal defining a central exhaust port and a pair of delivery ports on the bottom of the valve body as well as a supply port on the side thereof. The body defines a cylinder in which a spool or shuttle moves toward and away from the exhaust port. A cover seals the upper open end of the body and defines a second cylinder in which a large piston moves from an upward, non operative position to a lower, operated position in engagement with the spool. The cover includes a control line port through which control pressure is applied to the valve. Service brake delivery pressure for the brake system is available at the supply port of the relay valve and sealed from the two or more delivery ports by a pair of O rings sealing the spool to shuttle in the body. The spool is displaced downward by the piston and opens communication between the supply port and its pressure surrounding the spool or shuttle and the delivery port by grooves in the intermediate section of the spool cylinder.

21 Claims, 7 Drawing Sheets

RELAY AND BOOSTER VALVES FOR AIR BRAKE SYSTEMS

BACKGROUND OF THE INVENTION

The relay valve of modern tractor-trailer combinations constitutes an important part of the air brake system. It is connected to the control line from the operator, to a reservoir constituting the source of operating pressure for the service brake, and to the service brake as well as providing discharge of released brake pressure to atmosphere. The operating response, the reliability and the pressure drop through the relay valve are all of critical importance to the brake system as a whole.

In the past, many types of relay valves have been developed, each with different criteria in mind. Attempts have been made to achieve a pressure balanced relay valve through pressure equalization features such as the use of a single "O" ring to seal the housing to both a piston and a shuttle as disclosed in U.S. Pat. No. 4,096,884 to C. Horowitz issued June 27, 1978. Pressure balancing has also been an objective of the design disclosed in U.S. Pat. No. 3,858,610 to B. Klimek issued Jan. 7, 1975 and U.S. Pat. No. 3,512,552 to Dobrikin et al issued May 19, 1970. Proportioning relay valves have been disclosed in U.S. Pat. Nos. 3,944,294 to Masuda et al, issued Mar. 16, 1976, 3,936,097 issued to Yanagawa et al on Feb. 3, 1976, 3,945,689 to Masuda et al issued Mar. 23, 1976. A combined load sensing and relay valve is disclosed in U.S. Pat. No. 4,045,094 issued to Yanagawa et al on Aug. 30, 1977.

Despite the state of development of relay valves, none has achieved a true low opening pressure, fast response time and a pressure balance across both the valve piston and spool or shuttle in one valve. In fact, none, to our knowledge has achieved low operating pressures in the order of one or two psi at the control line input. None has achieved a basic relay valve design which may be converted to a booster valve by the simple addition of an intermediary plate.

BRIEF DESCRIPTION OF THE INVENTION

Faced with the state of the art we sought to improve relay valves and booster valves in order to give them a response characteristic in which the relay valve begins operation at as low as one psi of control line pressure as opposed to a few psi minimum control line pressure, heretofore.

We also sought to produce a booster valve designed for use in multiple trailer installation which employed basically the same structure as the relay valve with only minimum changes and which provide a significantly faster operation than booster valves in the past. In fact, we sought and obtained a booster valve design which reach an operating pressure level of sixty psi in less time than prior booster valves.

Both of these valves are relatively simple in design, reliable and low cost while offering improved performance.

Basically, the relay valve employs a body preferably of metal defining a central exhaust port and a pair of delivery ports on the bottom of the valve body as well as a supply port on the side thereof. The body defines a cylinder in which a spool or shuttle moves toward and away from the exhaust port. A cover seals the upper open end of the body and defines a second cylinder in which a large piston moves from an upward, non operative position to a lower, operated position in engagement with the spool. The cover includes control line port through which control pressure is applied to the valve.

Service brake delivery pressure for the brake system is available at the supply port of the relay valve and sealed from the two or more delivery ports by a pair of O rings sealing the spool or shuttle in the body. The spool is displaced downward by the piston and opens communication between the supply port and its pressure surrounding the spool or shuttle and the delivery port by grooves in the intermediate section of the spool cylinder.

In the normal unoperated position, atmospheric pressure applied to both ends of the spool and piston and the valve is balanced. Supply pressure is applied equally and opposite to two O ring seals on the spool to provide balance supply pressure. A return spring surrounding the exhaust port and bearing on the spool maintains the spool in its upward position in the absence of control pressure. The piston has an area many times greater than the spool surface to which it is exposed and therefore, provides forced magnification. The application of as low as one pound controlling line pressure to the control port applied to the upper base of the piston produces downward movement of the piston until it engages the spool and further downward movement of the spool subject only the return spring resistance until communication is established between the supply and delivery ports. Therefore, virtual zero opening pressure relay valve is achieved.

The booster valve in accordance with this invention includes each of the elements of the relay valve described above except that it includes a separator plate located between the valve body and the cover including a bypass check valve between the delivery port and the delivery pressure manifold located beneath the area between the supply inlet line and the delivery port and a second check valve between the delivery pressure manifold and the underside of the piston.

The booster valve provides virtually 1:1 response at a rear trailer and faster operate and release cycles than heretofore possible.

BRIEF DESCRIPTION OF THE DRAWING

This invention may be more clearly understood from the following detailed description and by reference to the drawing in which.

DETAILED DESCRIPTION OF THE INVENTION

Figure 1:
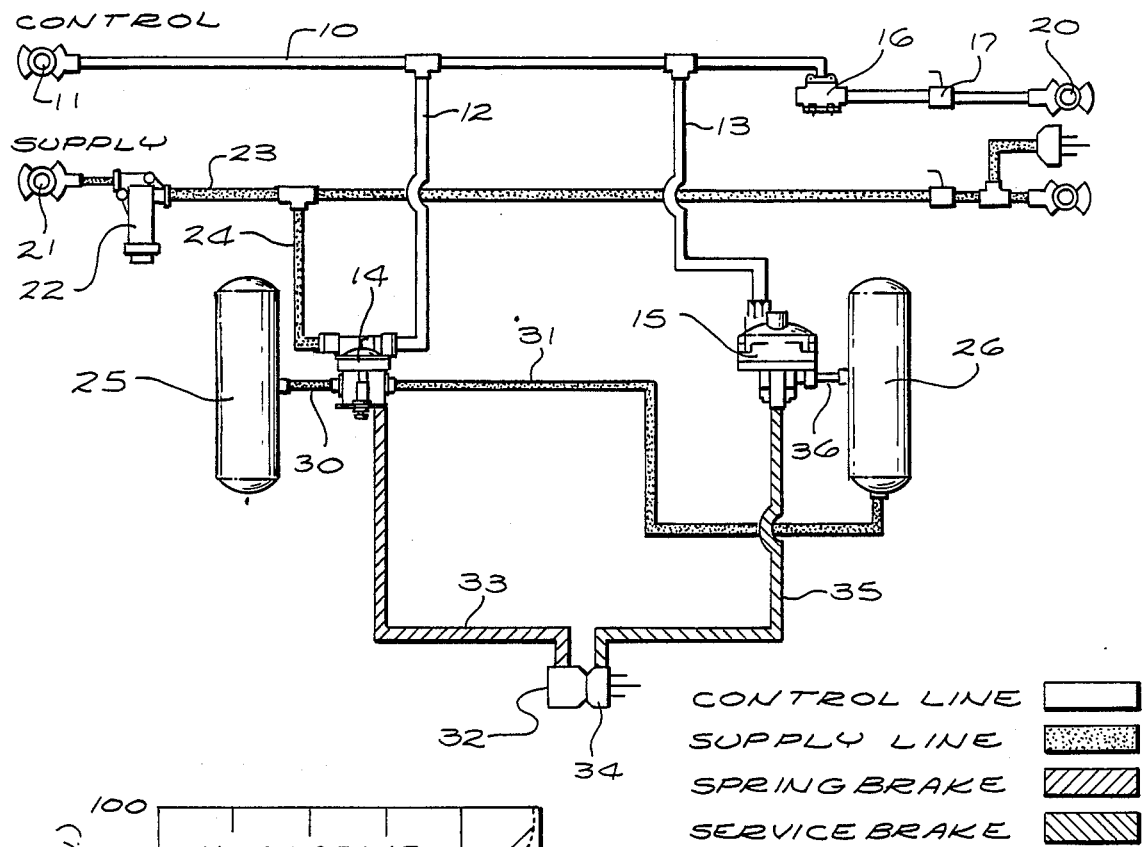
FIG. 1 is a pneumatic piping diagram showing a typical single axle trailer service brake system incorporating this invention.

Now referring to FIG. 1 a typical single axle trailer brake system is illustrated including a control line 10 and coupling 11 from the tractor cab through which modulated control pressures from the operator are applied by suitable piping and coupling 11. Control pressure ranging is supplied through branch lines 12 and 13 to respectively to a ratio relay valve 14 and to a relay valve 15 of this invention. Control pressure is also available from line 10 by a quick release valve 16, shut off cock 17 and coupling 20 to any following trailers in use.

Supply pressure from the tractor mounted compressor arrives over coupling 21, passes through line filter 22 to the main supply pressure line 23. Supply pressure is supplied over branch line 24 to the ratio relay valve 14 and therethrough to reservoirs 25 and 26 over lines 30 and 31, respectively. The reservoirs 25 and 26 provide on board supply of compressed air which are used;

(1) To maintain a spring brake 32 in its unoperated condition via a line 33; and (2) To supply normal braking pressure to a service brake 34 by lines 35 and 36 through the relay valve 15.

The ratio relay valve 14 is preferably a Sealco model 11071 ratio relay valve.

Figure 2:
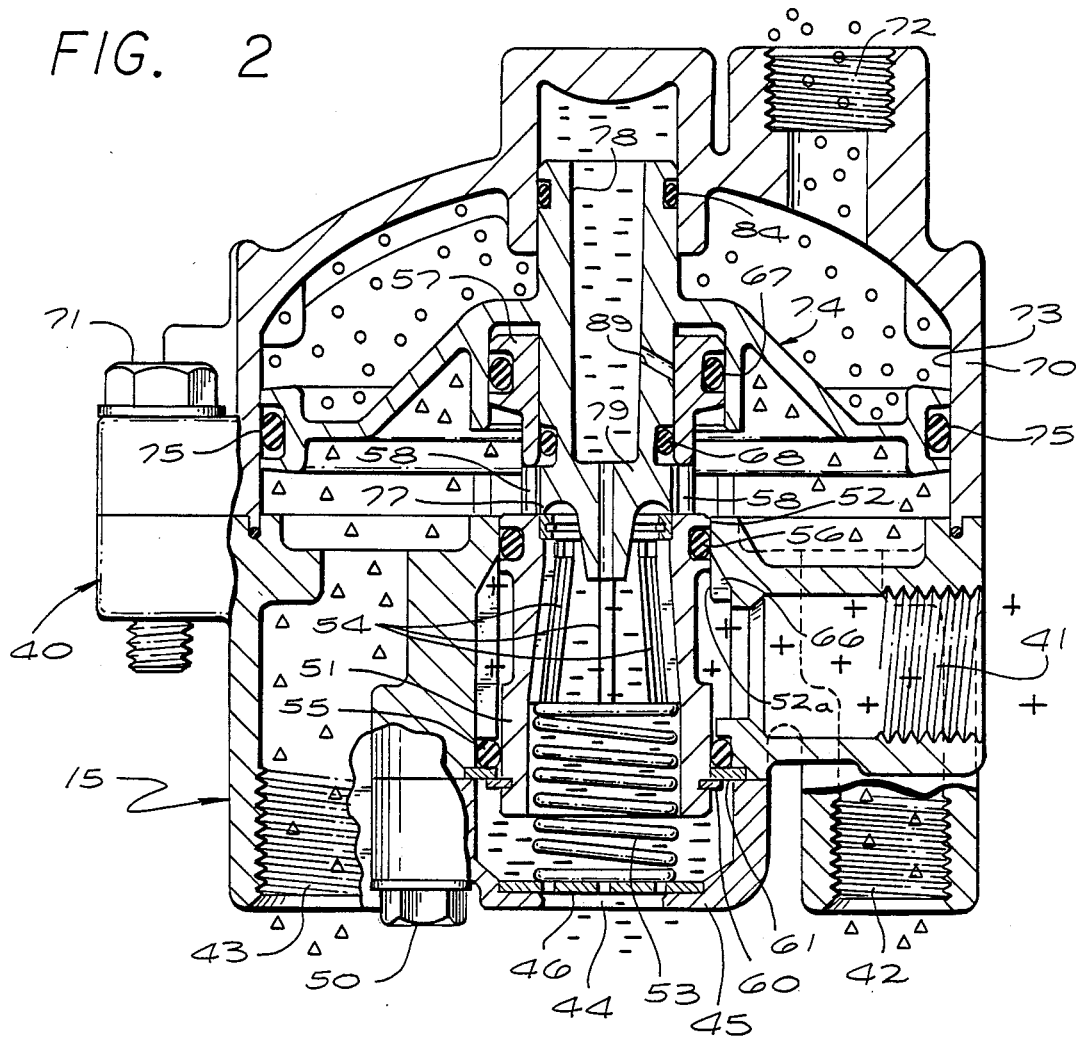
FIG. 2 is a vertical sectional view through the relay valve of this invention employed in the system of FIG. 1 showing the piston 74 partially retracted and the spool 51 is its uppermost position.

For more understanding of the relay valve 15 of FIG. 1, reference is now made to FIG. 2. The relay valve 15 includes a valve body generally designated 40 defining a supply port 41 and a pair of delivery ports 42 and 43 as well as an exhaust port 44. The exhaust port 44 includes a cap 45 and a perforated diaphragm 46 both held in place on the underside of the body 40 by machine bolt 50. The supply 41 and delivery ports 42 and 43 are tapped for threaded connection through their appropriate supply line 36 of FIG. 1 and delivery line 35 of also of FIG. 1. Also, the exhaust port 44 is open to the atmosphere and to the inside of a movable spool 51 which, with its sleeve extension 57, slides in a cylinder 52 in the valve body 40. A return spring 53 bears against the exhaust port cap 45 of FIG. 2 and the ends of a number of internal ribs 54 of the spool 51.

The outer surface of spool 51 is sealed toward its lower end to the cylinder wall 52 of the body 40 by an O ring 55 and at its upper end by an O ring 56. Upward movement of the spool 51 is limited by its retaining ring 60 which engages a washer 61 captured in an annular groove in the body 40 by the exhaust port cover 45. The spool 51 has approximately one quarter inch of travel.

The open upper end of the body 40 is closed by cover 70 and is secured in the body by machine bolts 71, one of which appears in FIG. 2. The cover 70 includes control line inlet port 72 and defines cylinder 73 in which a piston 74, coaxial with the spool 51, moves in a vertical direction downward in response to control pressure applied to the upper face thereof and upward responsive to the return spring 53 acting through the spool 51 the upper sleeve extension 57 which engages the underside of the piston 74. The piston 74 includes a hollow stem 78 sealed to the cap 70 by O ring 84 and having its lower end engaging the sleeve extension 57 of spool 51.

The sleeve extension 57 of spool 51 includes a plurality of first internal ports which, in the position in which the parts are shown in FIG. 2 are closed by the rim 77 on the downwardly extending end of stem 79 of the piston 74, but which are opened whenever the piston 74 is retracted upward while the sleeve 51 is restrained by its stop 61. Ports 58 allow exhausting of delivery port 42 and 43 pressure to atmosphere through the exhaust port 44 whenever the piston 74 is fully retracted.

Grooves 66 in the cylinder wall 52 form a port between the cavity open to the supply port 41 and the cavity open to the delivery ports 42 and 43 underlying piston 74. This port is closed when the spool 51 is in the uppermost position, as shown in FIG. 2, but is valved open to a greater or lessor extent as spool 51 is caused to move downwardly beyond the position in which it is shown in FIG. 2A, permitting air to pass from supply port 41 to the cavity underlying piston 74 and out of the delivery ports 42 and 43, along the lines including plus marks in FIG. 2A.

We have found that effective operation of the relay valve of this invention can be achieved when the values are selected as follows:

| O Ring No. | Area Sealed in sq. in. |
| --- | --- |
| 84 | 0.4418 |
| 67 | 1.1075 |
| 68 | 0.3712 |
| 75 | 9.6211 |
| 56 | 0.866 |
| 55 | 0.886 |

Spring 53 force on opening 5 lbs.

These all cooperate to provide the balanced substantially 1:1 ratio at any control pressure setting.

Figure 5:
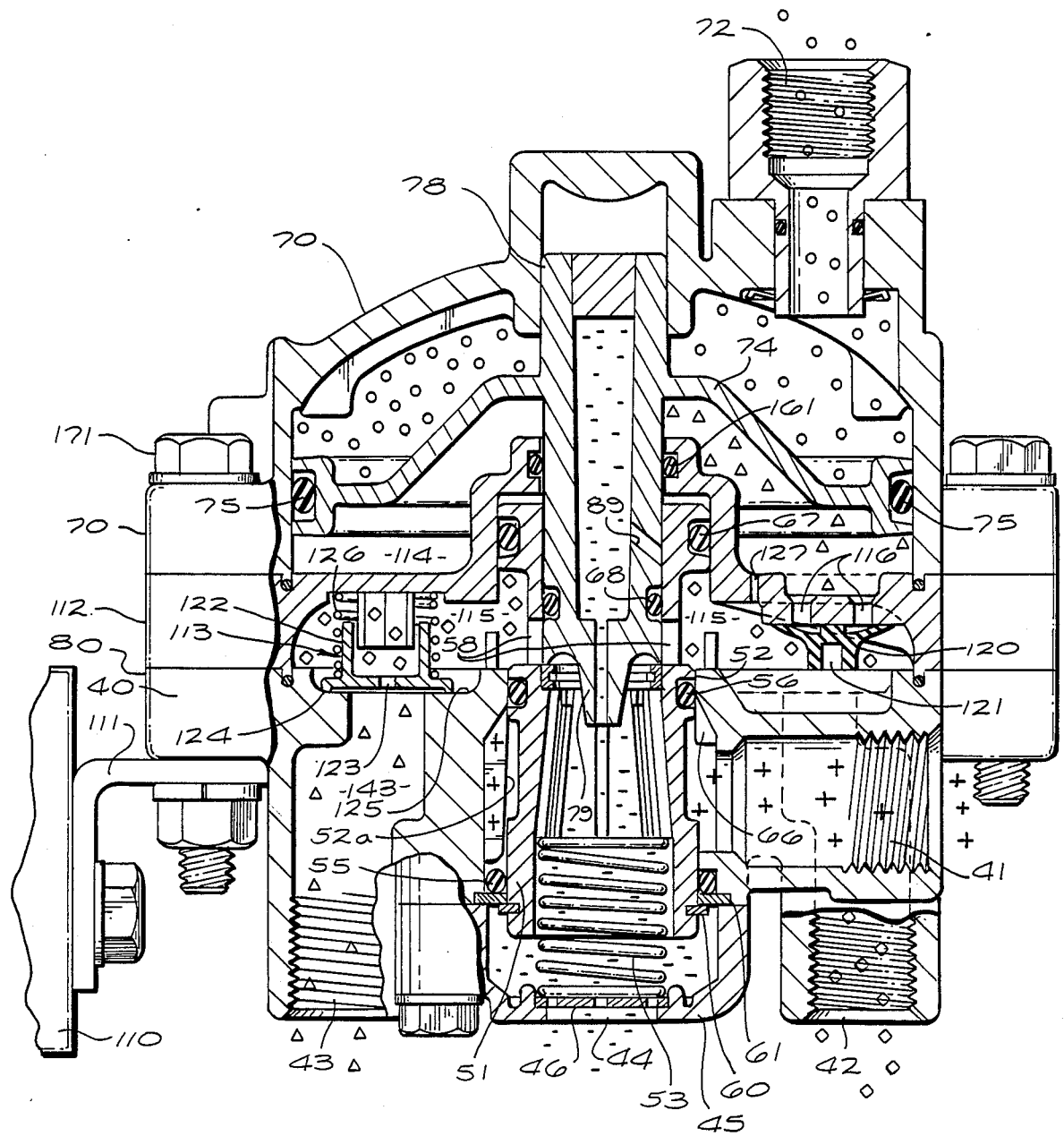
FIG. 5 is a vertical sectional view through the booster relay valve of this invention.

In the booster valve of FIG. 5, O ring 84 of FIG. 2 is not used but O ring 161 has been added which produces a sealed area of 0.3712 sq. in. identical with the area sealed by O ring 68.

OPERATION OF THE INVENTION

The relay valve 15 of FIG. 2, when located in the system of type shown in FIG. 1 operates in the following manner:

supply pressure in the order of 100 to 120 psi is present at the inlet port 41 and fills that port as well as the region surrounding the spool 51. This volume is indicated by the presence of (+) signs in the drawing. The volume within the spool and within the center void of the piston 74 and the volume above the piston 74 within the cap 70 is at atmospheric pressure as indicated in the drawing by a (−) sign. Minus sign is used for convenience but does not indicate negative pressure but merely the lowest pressure in the system. The control port 72 and the region above the piston 74 within cover 70 are at the control pressure which is normally atmospheric pressure with the brake unactuated. This condition is indicated by the presence of circles in the drawings. The delivery port 42 and 43 as well as the volume below the piston 74 are all at atmospheric pressure when the brake is not operated and at delivery pressure, for example 1-100 psi when the piston 74 has moved downward sufficiently to engage the spool 51 and displace it downward sufficiently that supply pressure is applied to the underside of the piston 74. These volumes are indicated by the presence of the small triangles.

Under normal static conditions, the control port 72 is at atmospheric pressure and the atmospheric pressure is applied to the upper face of piston 74. The delivery ports 42 and 43 likewise are at atmospheric pressure as is the exhaust port at all times. Under these conditions there is zero pressure differential across the piston 74. Note that the area of the upper and lower faces of piston 74 is equal and that the piston 74 is sealed to the cylinder wall 73 by an O ring 75. The underside of the piston is maintained at atmospheric pressure during unoperated periods via ports 58 in the upper side wall of the spool 51.

Upon the application of as little as 1 psi of the operating pressure to control line inlet port 72, the large area piston 74 moves downward, first closing ports 58 by movement of the internal stem portion 77 of the central column 78 of piston 74.

Further downward movement of piston 74 results in the lower faces 79 of the piston stem 78 engaging the upper face of the spool 51 driving it downward against the sole resistance of the return spring 53. Supply pressure applied to the adjacent faces of both the O rings 55 and 56 provides balanced supply pressure against the spool 51. Force amplification within the valve is accomplished through the use of the large (five square inch) piston 74 which will provide a multiplier of several times the control pressure applied. As the piston and spool move downward, the O ring 56 moves downwardly permitting air flow from the supply port 41 into the cavity below piston 74 and to delivery ports 42 and 43. When the pressure in the cavity below the piston 74 becomes equal to the pressure in the cavity above the piston, the spring 53 will move the spool 51 upwardly cutting off the flow of air from the supply 41 into the cavity below the piston 74. This balance will be maintained automatically whenever the control pressure at port 72 is increased or decreased. Therefore, a 1:1 control to delivery pressure ratio will apply and as low as one psi control pressure is sufficient to provide a several pound operating force on the spool 51 since the spool does not have to overcome the supply pressure. The result therefore is a low operating pressure valve which maintains a 1:1 control to delivery pressure ratio.

Whenever the control pressure is relieved, the unbalance of the supply pressure on the lower side or face of piston 74 causes the piston 74 to return upward and relieve the downward pressure on the spool 51. Return spring 53 drives the spool 51 upward in sequence closing off supply pressure access to the underside of the piston 74 and to the delivery ports 42 and 43 and continued movement upward under the influence of residual line pressure at the delivery ports 42 and 43 opens the supply ports 58 to the delivery ports allowing the delivery ports to exhaust the line pressure to atmosphere via the exhaust port 44.

BALANCING OF FORCES

Figure 3:
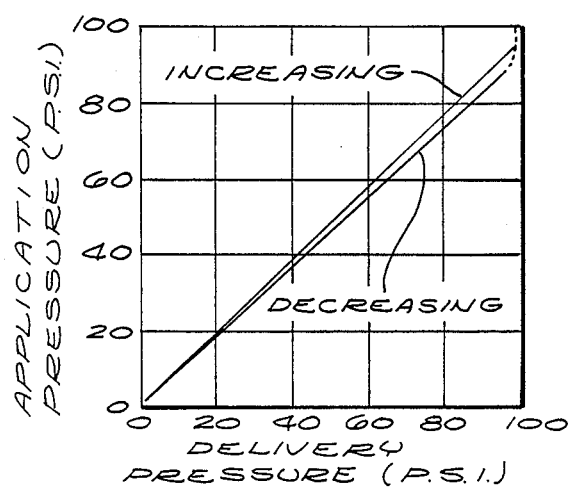
FIG. 3 is a graphical representation of the pressure response characteristic of the relay valve of FIG. 2.
Figure 6:
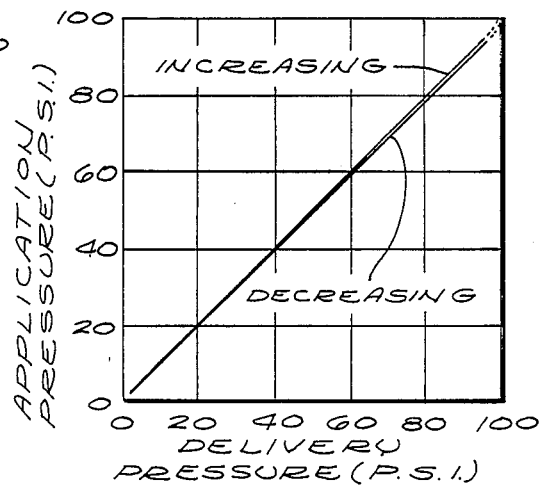
FIG. 6 is a pressure response diagram of the valve of FIG. 5.

The operation of the valve of FIG. 2 is well illustrated in FIG. 3 which shows the near 1:1 ratio of delivery pressure to application pressure over the range of zero to 100 psi on both increasing and decreasing pressure. There is extremely small hysteresis s illustrated by the area inside the two nearly straight lines of operations.

The low opening pressure, low hysteresis and fast response of the relay and booster valves of this invention are achieved principally by reason of the balance of forces maintained across both the piston 74 and the spool 51 at all conditions. Balance across the piston 74 is facilitated since the top and bottom surface areas of the piston are equal in area and the piston is free to move until the forces across O ring 75 are balanced. All of the top surface of the piston is exposed to control pressure from port 72. In the normal non-operated condition this is atmosphere pressure over line 10 of FIG. 1. The under side of piston 74 is exposed to the exhaust port 45, also atmospheric pressure. Thus, in a static non operated condition, the piston 74 forces are balanced and it will respond to any low operating pressure e.g. 1 psi at control outlet 72. The only force on the piston 74 is the return spring 53 until the piston 74 and spool 51 reaches the upper limit of travel and ports 58 are opened.

The spool 51 is balanced with respect to the supply pressure at the closed position shown in FIG. 2 since the spool 51 and two O rings 55 and 56 present equal areas to the supply pressure through port 41. Supply pressure from port 41 exerts forces radially inward only on the body of the spool 51 and none tends to restrict either the opening or the closing of the spool 51 valve.

As control pressure above atmosphere pressure arrives at port 72, as illustrated in FIG. 2A, even the minimum pressure e.g. 1 psi is sufficient to overcome the friction of the system causing downward movement of the piston 74 until its rim 77 engages the inner lip of spool 51 closing the ports 58 and overcomes the resistance of spring 53 as well as the spool 51 friction. The now unbalanced downward force on the spool O ring 55 and the upward supply pressure force on piston 74 matches the control force pressure supplied by the piston 74 and 1:1 equilibrium exists.

Supply pressure at the level of the control pressure flows to the brakes through ports 42 and 43. Equilibrium or balancing of forces at any static position of piston 74 exists. As an example, where the supply pressure at port 41 is 100 psi and 1 psi (above atmosphere) is applied to the control port 72, approximately 5 lbs. gauge downward force (1 psi×5 in. sq.) is applied to the upper surface of the piston 74. Atmospheric pressure of approximately 15 psi (0 gauge) opposes the movement of piston 74.

The 1 psi is the pressure differential across O ring 75. As piston 74 moves downward moving spool 51 downward, supply pressure of 100 psi indicated in FIG. 2A by the line with superimposed + signs passes O ring 56 in the grooves 66 between lands 52A into the volume under the piston 74 and out through the delivery ports 42 and 43. At this time downward force on the O ring 55 on the spool 51 remains 100 psi while the upper O ring 56 is relieved of pressure differential as the supply air fills the underside of the piston 74 and flows out through the delivery ports 42 and 43. A balancing of forces occurs since supply pressure is applied to underside of O ring 75, the underside of O ring 67, the underside of O ring 68 and the top of O ring 55. In the combination of these areas with atmospheric pressure on top of O ring 67 via port 89, on top of O ring 68 and on top of O ring 69 brings the control pressure and delivery pressure to be balanced thereby eliminating hysteresis normally found in relay valves.

BOOSTER VALVE

As indicated above, a further objective of this invention is to provide a booster valve suitable for installation on a dolly having a pair of service brakes and a reservoir but no spring brake system. Such a system is disclosed in FIG. 4 in which the same elements present in FIG. 4 are given the same reference numerals as found in FIG. 1 for purposes of clarity.

Figure 4:
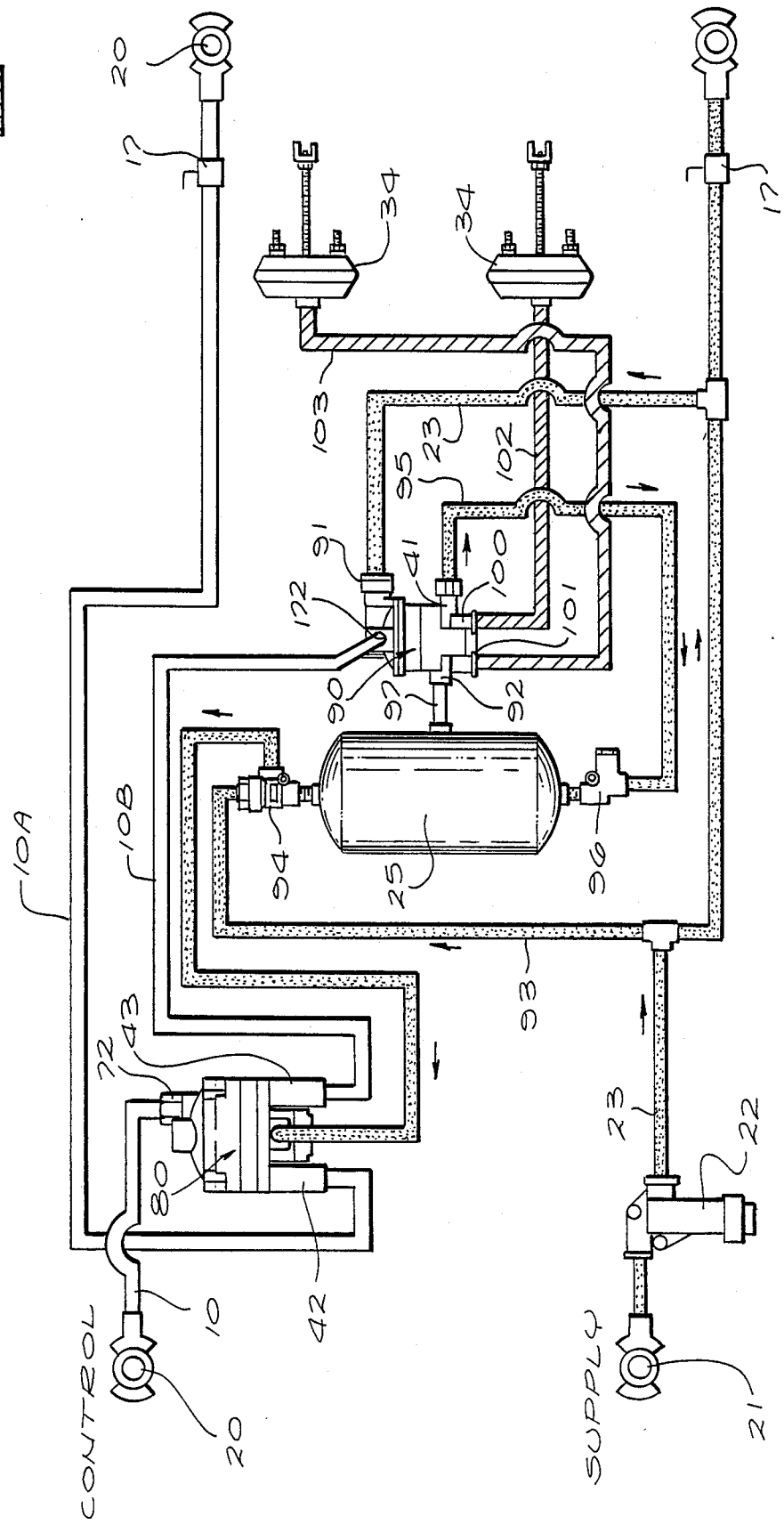
FIG. 4 is a pneumatic piping diagram of a single axle dolly system corporating the booster relay valve of this invention.

Referring now to FIG. 4, control line 10 may be seen which is a continuation in actual operation of the control line 10 of FIG. 1. The dolly on which this system is mounted is secured by coupling 20 to the preceding section of control line In FIG. 4 the control line 10 is connected to the inlet port 72 of booster valve 80 of this invention and employs its delivery ports 42 and 43 for delivery of the control pressure to following dolly or trailers by control line 10A from port 42 and to the local relay emergency valve 90 from port 43 via control line 10B. The booster valve 80 passes control line pressure to an outlet coupling 20 at the end of control line 10A via shut off cock 17 normally in its open position similar to FIG. 1. Control line 10B provides the control pressure input to relay valve 90 which is preferably a Sealco Dolly Relay Emergency Valve No. 110267 similar to the relay valve in FIG. 2 with the exception that it has, in addition to its control inlet port 172, a reservoir port 92, two delivery ports 100 and 101 and an emergency supply port 91, the last of which is coupled by line 23 and line filter 22 and coupling 21 to the supply pressure line which is a continuation in actual operation of the supply line 23 of FIG. 1. Emergency supply port 91 is also coupled via lines 23 and 93 and a two way check valve 94 to reservoir 25. Supply port 41 is coupled via line 95 and pressure protection valve 96 to reservoir 25 as the supply to the reservoir 25. Pressure protection valve 96 may be a valve such as the Sealco Pressure Protection valve No. 110257.

The two service delivery ports 100 and 101 of dolly relay emergency 90 serve two service brakes 34 via respective service brake lines 102 and 103. Their source of supply pressure is the reservoir 25 via line 97 port 92 of valve 90.

For a more complete understanding of the booster valve 80 and its operation, reference is now made to FIG. 5 in which, again, the same elements present in FIG. 2 are given the same reference numerals as in FIG. 2 and the same method of representing air flow is used except that delivery pressure exists at two different levels and are designated by a triangle for the lower flow rates and pressure and the diamond for the higher flow rates and pressure.

Now referring specifically to FIG. 5, the booster valve 80 is typically mounted to dolly 110 by a bracket 111 employing two of the assembly bolts 171 corresponding to bolt 71 of FIG. 2 but of greater length to accommodate the present of a separator plate 112 present between the valve body 40 and cover 70. The delivery ports 42 and 43 as well as the exhaust port 44 and its cover 45 are located in the bottom of the valve body 40 as is the perforated exhaust diaphram 46 and return spring 53 for the spool In this case the delivery port 42 and 43 will exhibit different flow rates and pressures which will be described below. The pressure at the port 43 will equal that present in that same port in the valve of FIG. 2 however, the flow rate will be modified by the presence of bypass check valve 113 present in the separator plate 112 and blocking the port 43 from the underside of the piston 74.

The valve body 40 defines the same cylinder 52 and the spool 51 is sealed to cylinder wall 52 by O ring 55 at the bottom and O ring 56 at the top when the spool 51 is in its, at rest, position. The valve body 40 also includes the supply port 41. It can therefore be seen that the body 40 and its internal components are unchanged as compared with valve of FIG. 2.

The cover 70 likewise is unchanged from the embodiment of FIG. 2 and the piston 74 is virtually unchanged with the exception that it lacks an O ring groove and O ring at the top of the axial column 78 and is longer to extend through the separator plate 112.

Other than the above the body 40, cover 70 and spool 51 are identical with their similar numbered parts in FIG. 2.

In accordance with the features of this invention, the elements of the combination which change from the relay valve of FIG. 2 to the booster valve of FIG. 5 are located in the separator plate 112. First and most important component of the separator plate is its upper wall 114 which separates the volume below the piston 74 from the manifold region 115 which communicates with the delivery ports 42 and 43 as well as the supply port 41 when the booster valve is operated. The upper wall 114 of the separator plate 112 includes a plurality of openings 116 therethrough, which are located above a simple rubber check valve 120 in the form of a cup located on a pillar 121 which is integral with the valve body 40. When pressure in the manifold 115 below the upper wall 114 of the separator plate 112 is greater than that pressure below the piston 74, check valve 120 is closed. When the reverse situation exists, check valve allows pressure equalization between the two chambers with flow from the region below the piston 74 to the manifold region 115. Separator plate 112 is sealed to the piston 74 stem 78 by O ring 161.

The separator plate 112 also mounts the bypass check valve 113 which blocks the upper entrance 143 to the delivery port 43. The bypass check valve 113 comprises a generally top hat shape plastic poppet 122 including a central orifice 123 and an outer rim 124 which seals against the seat 125 formed integrally in the valve body 40. A light spring 126 bearing against the under face of the upper wall 114 of the separator plate 112 holds the bypass check valve 113 in a closed position. Flow from the manifold 115 to the delivery port 43 is through the orifice 123. Whenever the reverse pressure differential exist between the delivery port 43 and the manifold 115 sufficient to compress spring 126, the bypass check valve opens and pressure is rapidly equalized between the port 43 and the manifold 115. This occurs upon brake release.

OPERATION OF BOOSTER RELAY VALVE

The booster valve 80 of FIG. 5, was designed particularly to relay the signal on the control line in an air brake system of multiple unit tractor and trailers, i.e. double and triple trailers with a minimum of time delay in both operate and release cycle. The booster valve 80 exhibits the same low opening pressure, e.g. 1 psi on the control line 10 insuring that the control signal is picked up and relayed to the rear trailer at the lowest possible signal level. The balance of forces in the booster valve 80 on both the piston 74 and the spool 51 with virtually no hysteresis insures that the signal relayed to the rear trailer will not be at a lower pressure.

The booster feature of the valve insures that the fastest possible signal is relayed to the rear trailer units by controlling the flow of delivery air pressure to the dolly port 42, the driver has the assurance that the dolly brakes 34 are not applied prior to the rear trailer brakes.

Operation of the valve 80, similar to valve 40 of FIG. 2, occurs with supply air pressure furnished to port 41 and the supply air surrounds the spool 51 in the areas indicated by the +sign whenever the spool 51 has its retaining ring 60 bearing against captured washer 61. This is the normal, at rest, position for the spool 51 and it remains in this position unless a downward force from piston 74 moves spool 51. When the
downward force is relieved the spool 51 returns to this, at rest, position.

In making a brake application, air pressure from control valve in the cab is introduced into port 72 filling the cavity between the cover 70 and the upper face of piston 74. The introduction of air pressure on top piston 74 moves the piston downward, hereby closing the first internal ports 58 thus closing communication between the manifold 115 and the exhaust port 44.

Figure 2B:
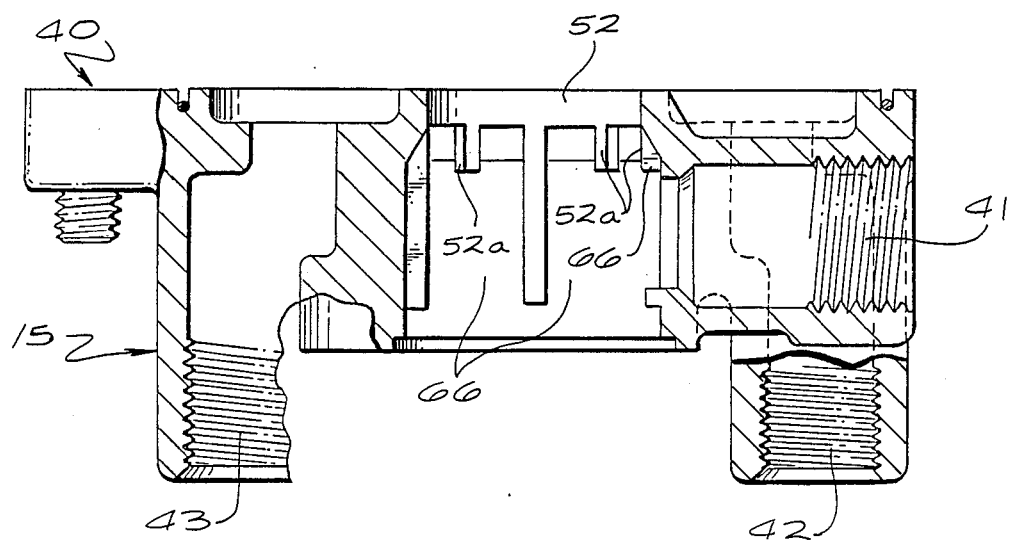
FIG. 2B is a fragmentary horizontal sectional view of the spool cylinder of FIG. 2.
Figure 2A:
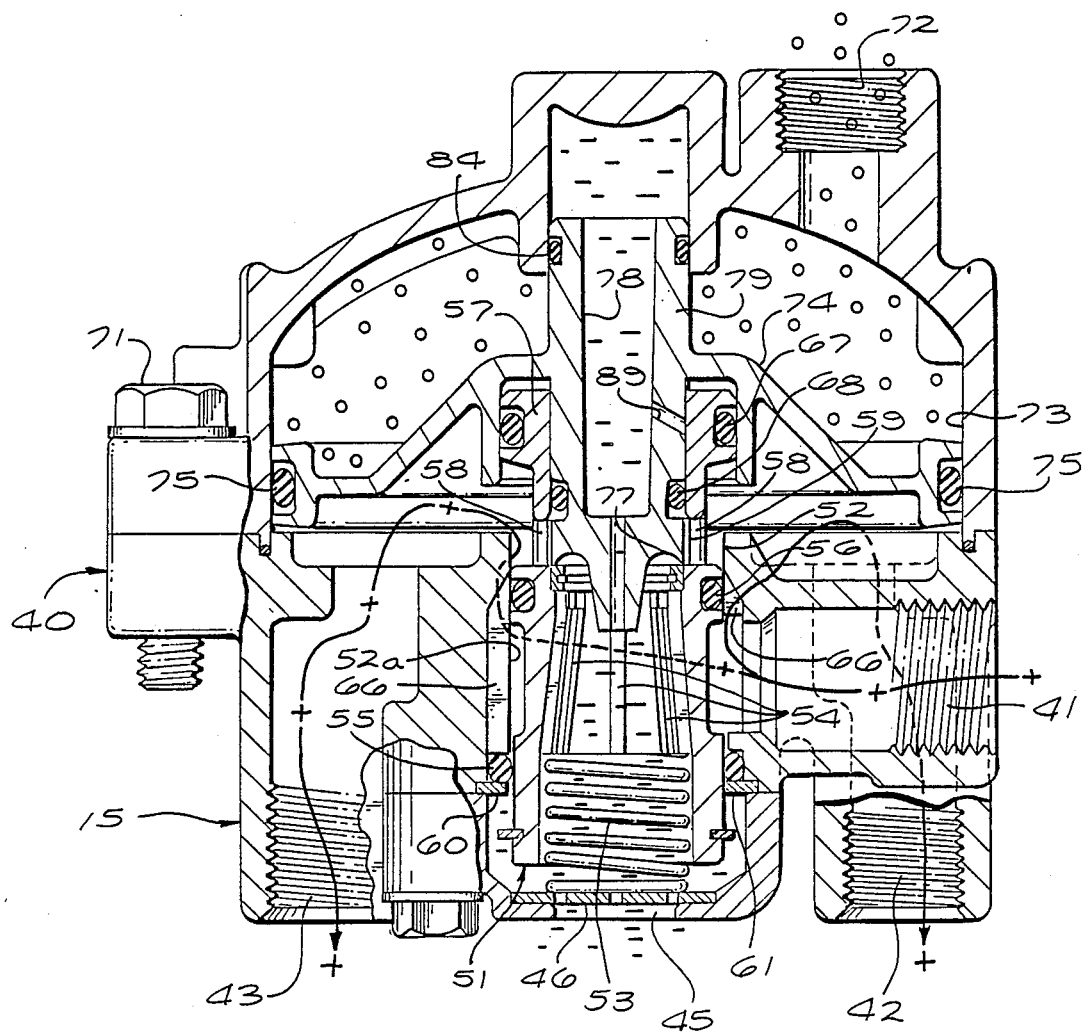
FIG. 2A is a vertical sectional view similar to FIG. 2 with the piston 74 and the spool 51 lowered.

Further downward movement of piston 74 causes spool 51 to move downward partially unseating O ring 56 in the grooves 66 between lands 52A best seen in FIG. 2B. This allows the pressure from the inlet port 41 to enter the manifold 115 and be applied directly to delivery port 42 and at a controlled rate via the orifice 123 in the bypass check valve 122 to the delivery port This signal to port 42 is speeded on its way by controlling the lapoff of the valve (the rate or time to reach a balanced condition) through the orifice 127 in the separator plate 112.

On fast application of the brakes the fastest possible signal is needed to apply to the rear trailer. This occurs when the valve 80 is opened, air pressure in the manifold 115 fills the delivery line from port 42 before the valve is allowed to lapoff through the controlling orifice 127 and air pressure pass to the underside of the piston 74. At the same time this is taking place, the orifice 123 of the bypass check valve 122 controls the flow of air pressure to delivery port 43 to apply the dolly brakes.

The low opening feature of the valve 80 is achieved by the fact that pressure from the reservoir 25 arriving at port 41 working against both O rings 55 and 56 having the same effective area produces no biasing force in either direction. When air pressure from the control valve in the cab via port 72 is introduced and into the valve 80 and moves piston 74 downward, the only opposing force is the spring 53 acting through spool 51. The balance of delivery pressure at port 43 and port 42 to the control line pressure of port 72 is achieved by the unique design of the spool assembly. Delivery pressure under the piston 74 is applied to the underside of O ring 75, to the underside of O ring 67, the topside of O ring 161 and to the underside of O ring 68.

Figure 7:
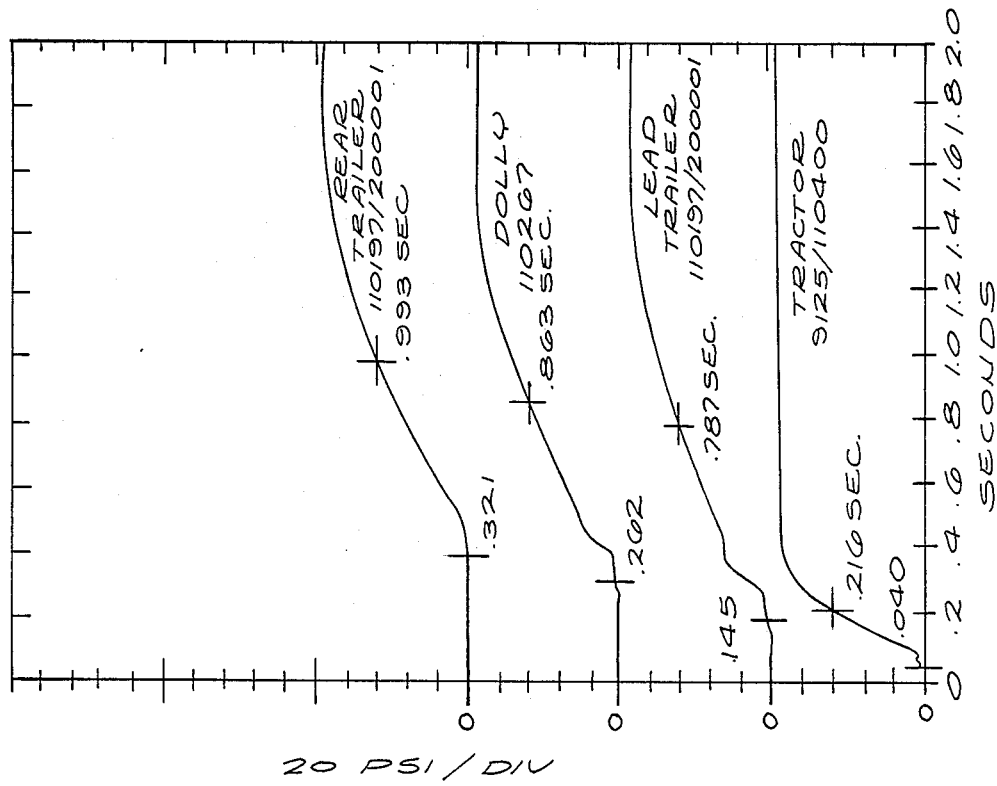
FIG. 7 is a graphical representation of the operate time response characteristic of a conventional brake system.

FIG. 7 illustrates the operating characteristics of a conventional brake system including a tractor, a lead trailer, a dolly and a rear trailer with the x axis representing pressure at 20 psi per division and the y axis measuring time in seconds from the instant of brake pressure application. The application time for pressure to rise from 0 psi to 60 psi is marked by a cross. This is the time from the driver's application of his foot to the brake pedal in the wide open brake application to the time each axle actually receives 60 psi of air pressure. FIG. 7 illustrates a typical air brakes system as used throughout the United States today.

The timing from 0 to 60 psi on the tractor axle is 0.216 seconds shown on the bottom curve. The lead trailer reaches 60 psi in 0.787 seconds. The dolly axle reaches 60 psi in 0.863 seconds. The rear most trailer axle reaches 60 psi in 0.993 seconds.

Figure 8:
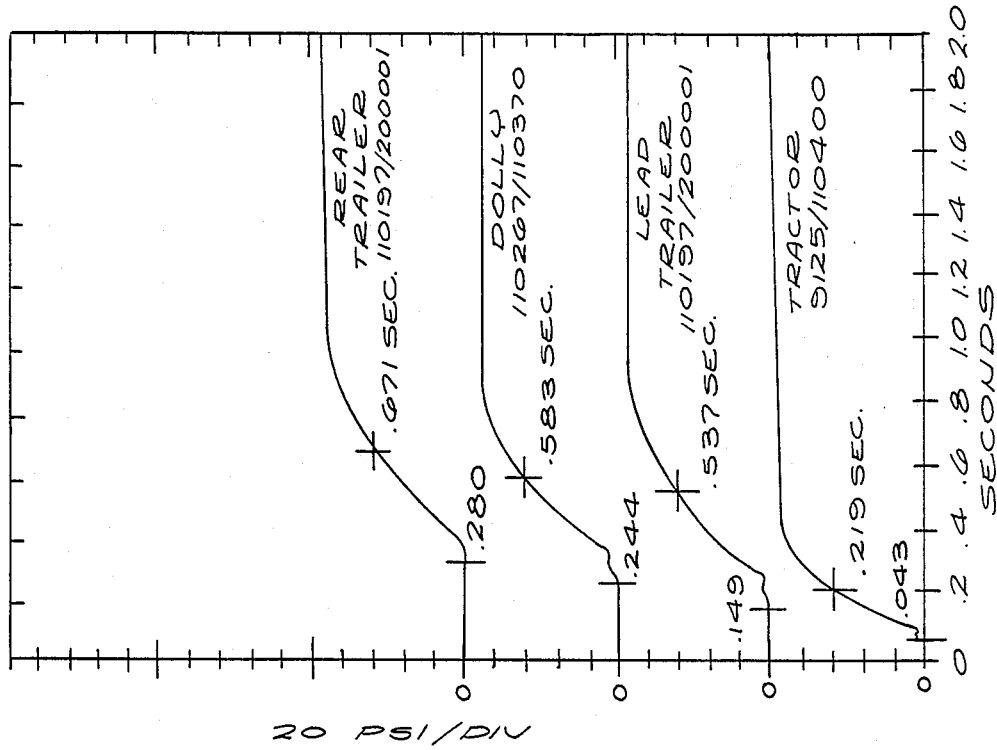
FIG. 8 is a graphical representation of the operate time response characteristic of a system employing a booster valve of this invention.

Now referring to FIG. 8, exactly the same system as used in obtaining the curve of FIG. 7, except for the addition of the booster valve of FIG. 5 is now illustrated. The improvement may be seen. The lower wave form for the tractor shows an operate time, of 0.219 seconds, virtually the same as in the previous system. The lead trailer has an operate time of 0.537 seconds, an improvement of 32%. The dolly axle applies 60 psi in 0.583 seconds, also a 32% improvement. The rear axle brakes reach 60 psi in 0.993 seconds, again for a 32% improvement. The overall system improvement for all towed trailer is 32%. This coupled with the low opening or operating pressure highlights the importance of this invention.

Figure 9:
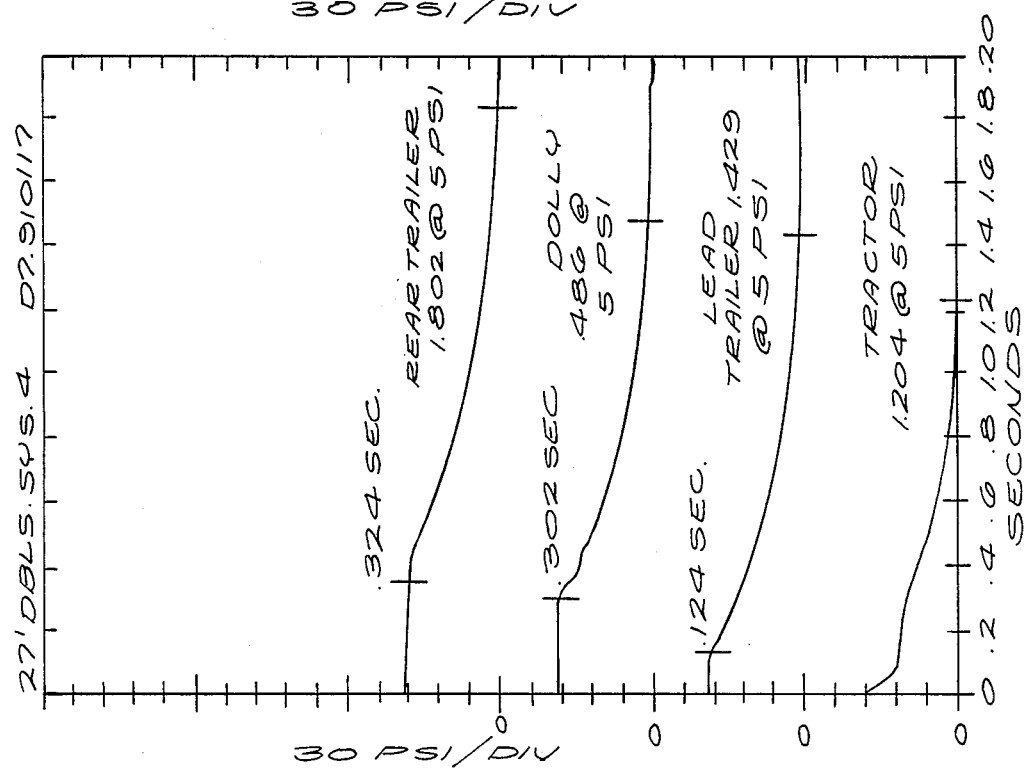
FIG. 9 is a graphical representation of the release time response characteristics of a conventional brake system.

Now referring to FIG. 9, the curves in this figure illustrate the same brake system as present in FIG. 7 in which the release of air from the brake system is timed from 95 psi to the air brake chamber at the axle down to 5 psi in each axle. The lower curve shows the tractor pressure, the next curve the lead trailer, the third curve, the dolly and the fourth curve, the rear trailer. The release time for the tractor is 1.204 sec., the lead trailer is 1.429 sec., the dolly is 1.486 sec. and the rear trailer is 1.802 sec.

Figure 10:
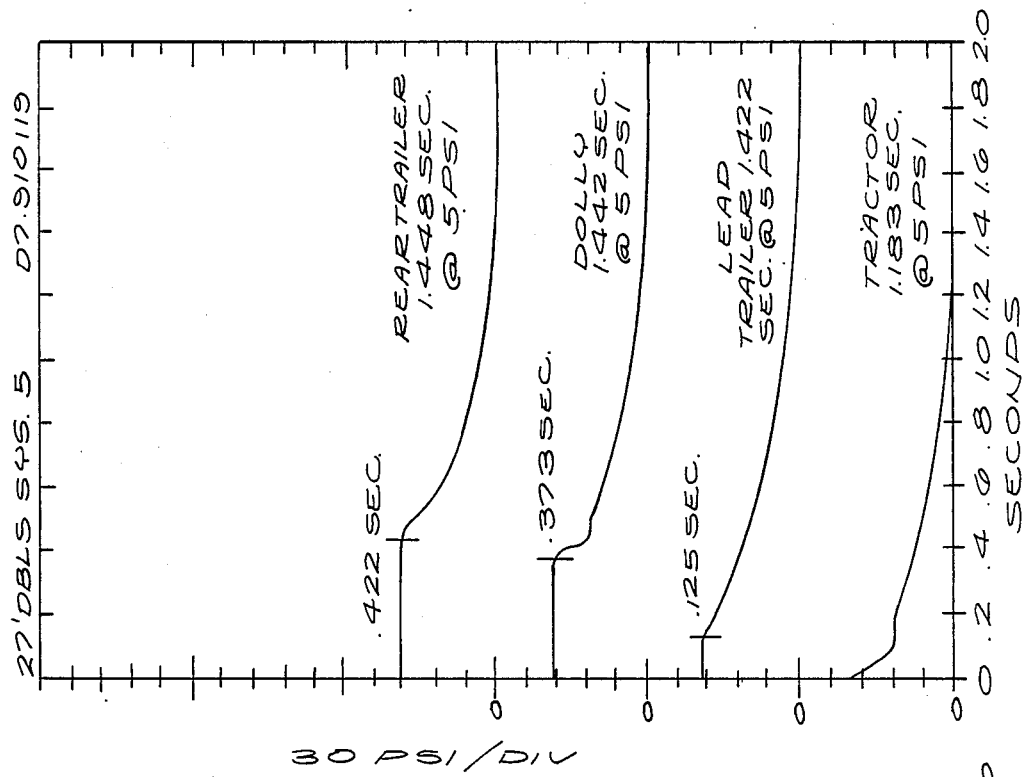
FIG. 10 is a graphical representation of the characteristic curve similar to FIG. 9 for the booster valve of this invention.

Employing exactly the same brake system only adding the booster valve 80 of this invention in the dolly axle control line, the operating characteristic is then illustrated in FIG. 10 with the curves in the same order. With the booster valve in place the tractor release time is 1.183 sec., the lead trailer 1.422 sec., the dolly 1.422 sec. and the rear trailer 1.448 sec. In each case the release time is improved and particularly the rear trailer illustrates the most improvement.

This invention shall not be limited to the illustrative embodiment but rather to the claims as set forth below which constitutes definitions of this invention including the protection afforded by the doctrine of equivalents.

What is claimed is:

1. A relay valve for a fluid operated braking system including a source of brake control pressure for operating the relay valve and a source of supply pressure to be applied to the service brakes of a vehicle comprising:
   a valve body defining a supply pressure inlet port, at least one service brake pressure delivery port and an exhaust port;
   said valve body further defining a control pressure inlet and with said valve body defining a first cylinder for receiving a piston to be operated responsive to control pressure from said control pressure inlet;
   a piston within said first cylinder having a pair of faces of the same dimension whereby substantially a 1:1 pressure relationship can be developed on the opposite sides of said piston in a non-operated condition;
   said body defining a second cylinder aligned with said first cylinder;
   a spool within said second cylinder including the outer surface thereof exposed to supply pressure from said supply inlet;

means sealing said spool within said second cylinder and applying supply pressure balanced in the directions of movement of said spool within said cylinder being responsive to movement of said piston in the presence of piston actuating control pressure;

first internal port means within said valve body for normally exposing the delivery port to said exhaust port;

means responsive to movement of said piston in response to control pressure at said control pressure inlet for closing communication through said first internal port means;

second internal port means communicating between said supply pressure inlet port and said delivery pressure port; and means responsive to movement of said piston in response to control pressure at said control pressure inlet for opening said second internal port means to allow supply pressure to be applied to said service brake pressure delivery port.

2. A relay valve in accordance with claim 1 wherein said means sealing said spool within said second cylinder comprises a air of O rings, spaced along the length of said spool and each presenting equal area exposure to supply pressure.

3. A relay valve in accordance with claim 2 including means sealing said spool to said piston for sealed relative movement therebetween.

4. A relay valve in accordance with claim 3 wherein said means sealing said spool to said piston is dimensioned whereby the combined forces applied to the underside of said piston at static and lapped off position is in a substantially 1:1 ratio with the control pressure.

5. A relay valve in accordance with claim 1 wherein said spool is hollow and the interior thereof is exposed to said exhaust port.

6. A relay valve in accordance with claim 1 wherein said spool includes said first internal port means.

7. A relay valve in accordance with claim 1 wherein said piston includes said means for closing said first internal port means.

8. A relay valve in accordance with claim 1 wherein said body and the spool defines said second internal port between said supply pressure inlet port and said delivery port.

9. A relay valved in accordance with claim 1 wherein said piston includes a stem portion extending toward said spool and said spool includes a sleeve portion overlapping said stem portion and said first internal port is opened and closed by said stem and sleeve.

10. A relay valve in accordance with claim 1 wherein said piston includes an upward extending guide portion in sliding engagement with said cover and including orifice means communicating between the volume within said cover sealed by said upward extending guide and said exhaust port.

11. A dual use relay valve for use in a fluid brake system capable of providing rapid application of supply pressure from a source to a plurality of brake lines in a fluid brake system through discrete brake ports at either a uniform or selected rate to different brake delivery ports comprising:

a valve body and closure defining a first cylinder and a second cylinder in fluid path communication with said first cylinder;

said valve body and closure further defining a control pressure inlet port communicating with said first cylinder, a supply pressure inlet port communicating with said second cylinder and at least two brake delivery ports;

a piston in said first cylinder responsive to control pressure signals at said control inlet port;

a spool in said second cylinder responsive to movement of said piston to move in said second cylinder;

said piston and spool defining a port for selectively applying supply pressure to said brake delivery ports as a function of the movement of said piston responsive to control pressure; and means insertable between said valve body and closure for introducing a flow control means in the fluid flow path from said supply pressure inlet to at least one of said brake delivery ports whereby the flow rate of brake pressure to the one of said brake delivery ports is different from the flow rate of brake pressure from the remaining of said brake delivery ports.

12. A dual use relay valve in accordance with claim 11 wherein said insertable means comprises a plate including a wall defining a manifold communicating with said flow control means.

13. A dual use relay valve in accordance with claim 12 wherein said plate includes a check valve therein preventing flow from said manifold to the side of said piston opposite the control pressure inlet port.

14. A dual use relay valve in accordance with claim 11 wherein said flow control means comprises a member in the flow path to said one of said delivery ports defining a flow control orifice therein.

15. A dual relay valve in accordance with claim 14 wherein said orifice defining member comprises a check valve which allows return flow from the said delivery port to said manifold.

16. A dual use relay valve in accordance with claim 12 wherein said piston includes a stem portion extending through the said plate and into contact with said spool; and including means for sealing said piston stem and said plate.

17. A booster valve for use in a fluid operated braking system including a source of brake control pressure for operating the booster valve and a source of supply pressure to be applied to the service brakes of at least two vehicles towed in series comprising:

a valve body defining a supply pressure inlet port, at least two delivery ports, and an exhaust port;

said valve body further defining a control pressure inlet and a first cylinder for receiving a piston to be operated responsive to control pressure at said control pressure inlet;

a piston within said first cylinder having a pair of faces of the same dimension whereby substantially a 1:1 pressure relationship can be developed on the opposite sides of said piston responsive to control pressure at said control pressure inlet;

said body further defining a second cylinder;

a spool within said second cylinder including an outer surface thereof exposed to supply pressure from said supply inlet;

means sealing said spool within said second cylinder with supply pressure balanced in the directions of movement of said spool within said cylinder;

said spool responsive to movement of said piston in the presence of piston actuating control pressure;

first internal port means within said valve body and closure means for normally exposing one delivery port to supply pressure when said spool has moved responsive to said piston;

and flow control means in the path between the supply and second delivery port operative to control the rate of pressure applied to the second delivery port to a rate less than the rate of application of supply pressure to the first delivery port.

18. A booster valve in accordance With claim 17 wherein said flow control means comprises a check valve including an orifice therein communicating between the supply pressure port and the second delivery port through said orifice when said valve is operated;

said check valve being operative to release excess pressure from said second delivery port to said exhaust port.

19. A booster valve in accordance with claim 18 including a barrier in sealed engagement with said valve body separating said piston from said supply pressure port except for a second flow control orifice;

said barrier defining with said valve body a manifold from which supply pressure is applied to said first and second delivery ports.

20. A booster relay valve in accordance with claim 19 including pressure relief means between said first cylinder and said manifold whereby excess pressure between said barrier and said piston may be relieved to said manifold.

21. A booster valve in accordance with claim 19 wherein said spool is positioned for movement by control with said piston;

said spool, in sequence, closing communication between said manifold and said exhaust port and opening said pressure supply port to said manifold.

* * * * *